Oct. 13, 1964         D. B. LONES ETAL         3,152,485
                    MAGNETIC ACCELEROMETER
Filed June 9, 1961                           5 Sheets-Sheet 1

INVENTORS:
Dain B. Lones
Timothy L. Hanley
By Willard M. Graham
Agent

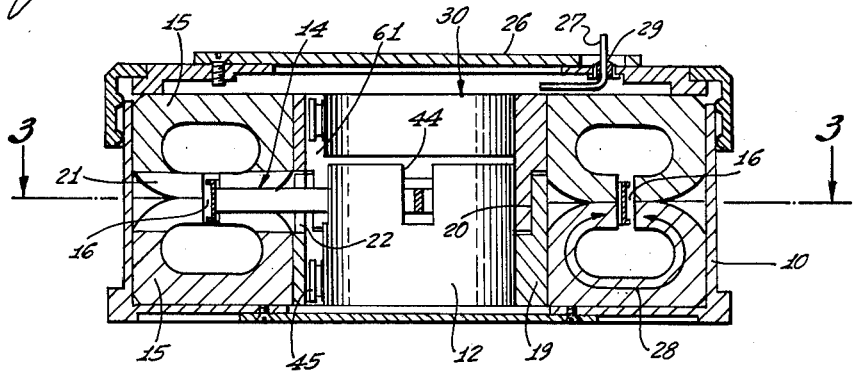
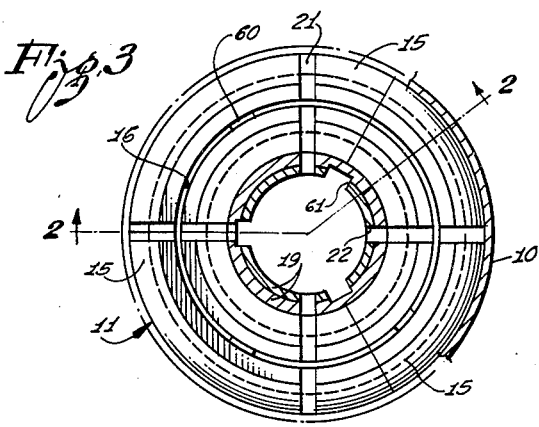
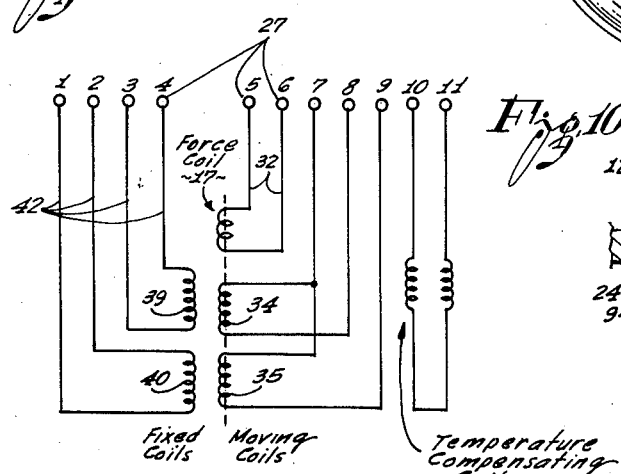
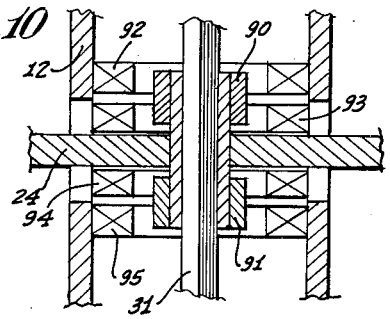

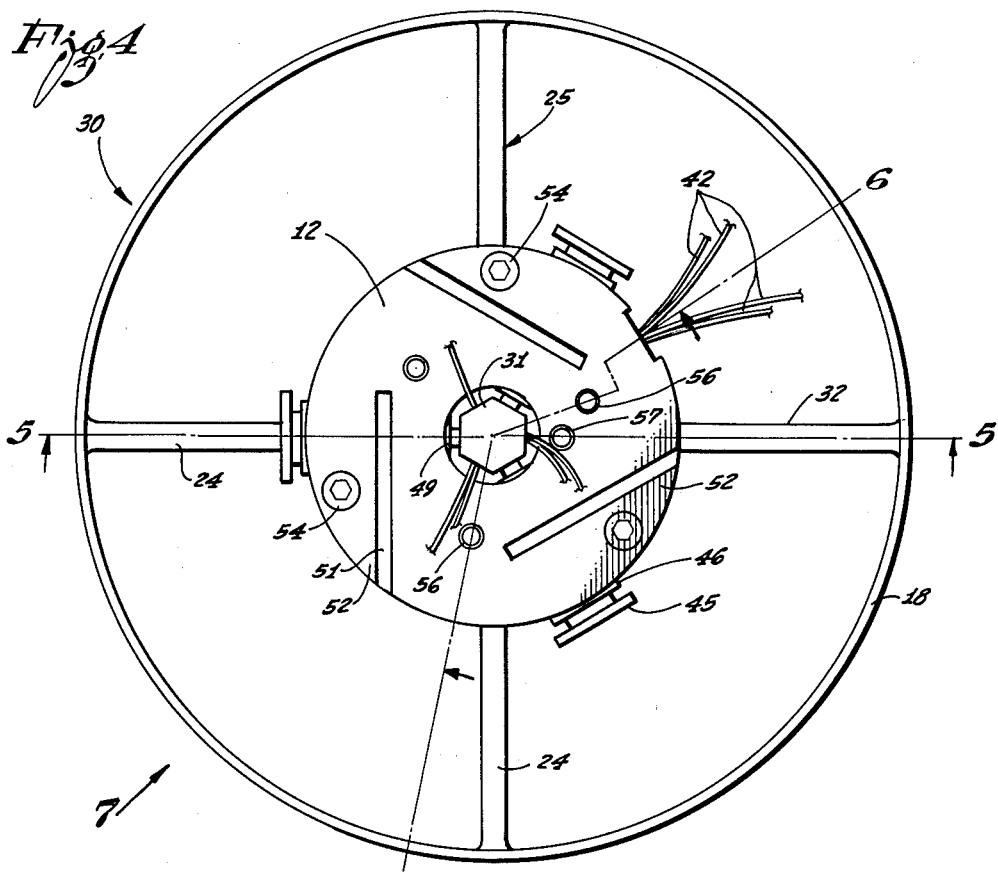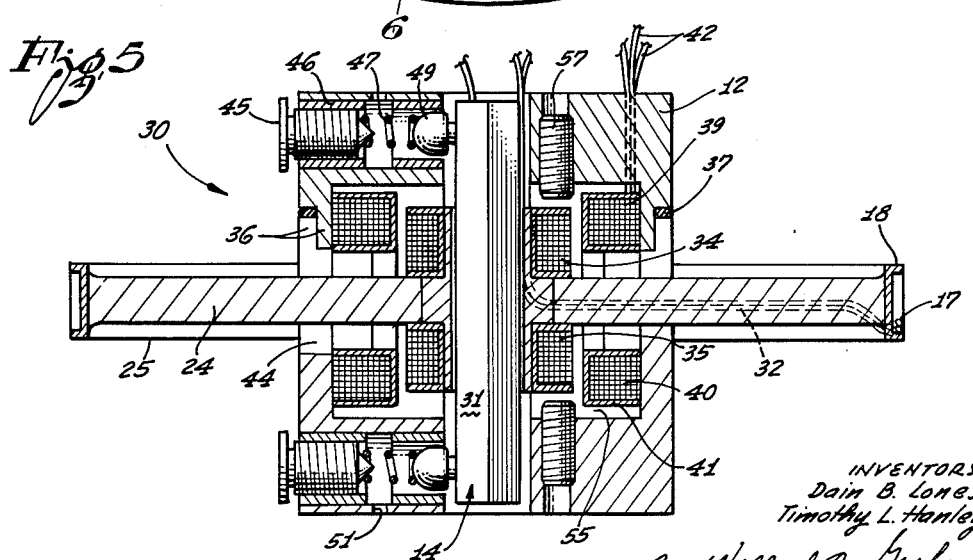

INVENTORS:
Dain B. Lones
Timothy L. Hanley
By Willard M. Graham
Agent

United States Patent Office 3,152,485
Patented Oct. 13, 1964

3,152,485
MAGNETIC ACCELEROMETER
Dain B. Lones, Palos Verdes Estates, and Timothy L. Hanley, Anaheim, Calif., assignors to Northrop Corporation, Beverly Hills, Calif., a corporation of California
Filed June 9, 1961, Ser. No. 115,998
19 Claims. (Cl. 73—517)

The present invention relates to accelerometers, and more particularly, to a magnetic accelerometer having improved suspension means for the movable mass, improved magnet design, and other new structural arrangements therein.

A major consideration in the design of an accelerometer of the inertial guidance class is the type of suspension to be employed for the proof mass. The elimination of perturbations introduced through the suspension system to the sensing axis by cross-axis accelerations is the crux of this problem.

One type of accelerometer is the magnetic type in which the movement and position of a proof mass along the acceleration-sensitive axis of the instrument is electro-magnetically detected or regulated. In analog operation, a current or voltage proportional to acceleration is produced. For operation in a digital system, the proof mass may be continuously oscillated about a neutral or reference position, in a path aligned with the sensing axis. The present invention applies to either an oscillating or a non-oscillating accelerometer.

In such a magnetic accelerometer, there are problems of magnetic gap flux stability and uniformity of gap flux density under temperature variations and perturbations created by external magnetic fields.

Accordingly, it is an object of this invention to provide a precision, inertial quality accelerometer for advanced guidance systems.

Another object of the present invention is to provide an accelerometer suspension system which subordinates all errors from the dynamics of the accelerometer, providing high cross-axis resonant frequency, minimum cross coupling, and a low anisoelastic constant.

It is a further object of this invention to provide, in a magnetic accelerometer, a novel magnet structure with capabilities of meeting extreme long term stability requirements in conjunction with maximum inherent, shielding from external magnetic fields, and having provisions for temperature compensation.

Still another object is to provide a non-elastic "guided" accelerometer suspension and a compatible flexural suspension that can readily be substituted for each other in the same case and magnet assembly. The so-called guided suspension applies to an oscillating accelerometer, while the flexural suspension applies to either an oscillating or a non-oscillating accelerometer.

Briefly, our guided suspension invention comprises a moving assembly having an elongated, axial, guided prism or shaft, upon which are affixed electrical signal means and novel structure mounting an electromagnetic force coil. At each end of the prism, a set of lightly spring-loaded adjustable guide rods, mounted in a surrounding body, bears with low friction against the prism at equal angular spacings thereround. Signal pick-off means are also mounted in the body. An edge-mounted flexural suspension is also provided as an alternate configuration. A fixed magnet assembly surrounding the aforesaid body forms an isolated magnetic gap in which the force coil operates, and is composed of a symmetrical enclosed circular arrangement of individual permanent magnets formed in segments and precisely aligned. Complete adjustments are provided for all alignment of the suspension means and signal pick-off means. Accelerometer diameter is considerably more than its length along the sensitive axis.

Other objects and features of advantage will be noted or specifically pointed out in the detailed description of a preferred embodiment to follow, but it is to be understood that various modifications as to form, detail design, proportion, and arrangement of parts may obviously be made without departing from the broad principles and features of construction underlying the invention.

In the accompanying drawings, shown by way of illustration and not limitation,

FIGURE 2 is a largely sectional elevation view of the accelerometer, taken as indicated by the broken line 2—2 in FIGURE 3, showing certain details of magnet structure and the overall body of the pick-off and force coil assembly.

FIGURE 3 is a cross section taken as indicated by line 3—3 in FIGURE 2 with certain parts omitted, showing further magnet structure.

FIGURE 4 is a top view of the pick-off and force coil assembly.

FIGURE 5 is a sectional elevation view of the assembly of FIGURE 4, taken as indicated by the line 5—5 in FIGURE 4, showing the working parts of this assembly.

FIGURE 8 is a schematic wiring diagram of the various coils in a preferred embodiment of this accelerometer.

FIGURE 10 is a diagrammatic cross section of an alternate pick-off coil arrangement, showing iron rings on the proof mass.

Figure 1:
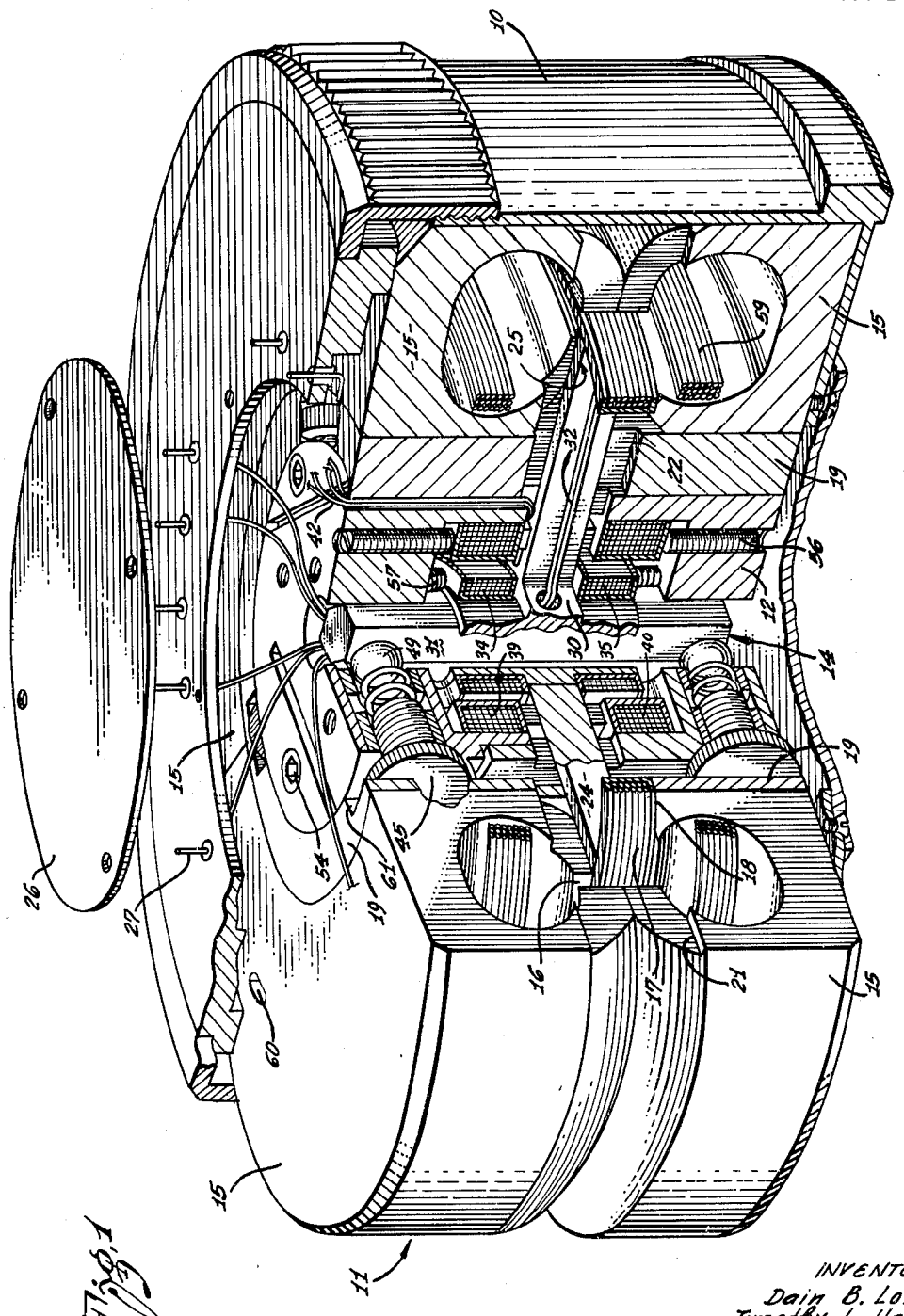
FIGURE 1 is a perspective view showing an entire accelerometer incorporating the guided suspension of the present invention, substantially one-fourth being cut away to expose interior details.

Referring first to FIGURE 1 for a description of specific apparatus, the accelerometer of the present invention is composed generally of an outer case assembly 10, magnet assembly 11, and force coil and pick-off assembly. The latter comprises a body 12 and movable proof mass assembly 14. Other elements shown in FIGURE 1 will be referred to later in this description.

As shown in FIGURES 1, 2 and 3, the magnet assembly 11 comprises six individual permanent magnet segments 15 assembled and bonded together in an upper ring of three and a contacting lower ring of three. A magnetic gap 16 is provided in the center of the resulting semi-torus shaped assembly, in which a force coil 17 wound on a relatively large diameter spider rim 18 operates. A two-part mounting sleeve 19 is provided as a central mount for the magnets, the latter being preferably bonded to the sleeve 19. The two parts of the sleeve 19 are preferably cylindrical ends, with an overlapping concentric joint 20. Clearance spaces 21 and 22 are provided in the magnets 15 and sleeve 19, respectively, for accommodating each of four spokes 24 of a force coil spider 25 (FIGURE 5).

This magnet assembly 11 and its stability are very critical and involve problems not encountered in the normal production of magnets. Since the present device is considered to be the heart of an inertial navigation system wherein flux changes at the magnetic gap 16 of one part in 100,000 are important, a further description of the present magnet structure will be given. A conventional permanent magnet assembly contains a combination of simple shapes of iron and permanent magnet material (Alnico) secured together to form the final desired configuration. However, conditions of vibration, shock, temperature changes causing differential thermal expansion, and the inherent difference in thermal conductivity of the parts of such an assembly can cause actual minute positional changes of the various elements in such a combination and consequent instability of the flux density at the magnetic gap.

The desired approach would be to cast the magnet structure in one solid ring piece but because of the coring problems and the inability to provide domain orientation in the required direction, this cannot be done.

To accomplish the same end in the present invention, the magnets are cast of solid Alnico in arcuate segments 15 as shown in FIGURES 1 and 3. In this embodiment, three segments are shaped to final size, being careful to hold all dimensions, especially of the magnetic gap 16, to close tolerances. The three are permanently bonded together to form a complete ring, and the ring is then magnetized. Two rings of three magnetized segments each are fitted together oppositely on the rigid mounting sleeve 19 at the time of assembly, to form the symmetrical enclosed-gap magnet assembly 11. Thus, there are no joints in the domain orientation plane as indicated by the arrow 28 in FIGURE 2 and the gap 16 must be produced by disintegration techniques.

FIGURE 2 also shows a case cover 26 having a plurality of electrical terminals 27 extending therethrough, each being mounted in an insulator 29. Terminals 27 will be referred to later.

A force coil and pick-off assembly 30 fits tightly inside the mounting sleeve 19 as shown in FIGURE 2, and details of the latter assembly are shown in FIGURES 4 through 7. Here, an elongated central guide prism 31, preferably made of fuzed quartz and fabricated to a high degree of optical accuracy, is hexagonal in cross section, and is permanently attached by any suitable adhesive method to the force coil spider 25 upon which is wound the force coil 17. Spider 25 is of non-magnetic material such as aluminum. The two force coil leads 32 are cemented to one spoke of the spider 25 and to one surface of the prism 31, extending out past one end of prism 31.

In the embodiment shown here, a pair of moving signal coils 34 and 35 are attached, as by a suitable adhesive, to the spider hub, one just above and one just below the spider spokes 24. One wire of each of the separate coils is brought together and soldered at the hub, and a lead from this connection plus the other two leads are brought out along the prism 31 next to the force coil leads 32. All four leads, however, of the two coils, may be brought out separately if desired.

The assembly just described comprises the movable proof mass assembly 14. It is installed in the body 12, which has an upper-cup-like part and a lower part, both aluminum, for example, with mating concentric cylindrical lips 36. After assembly, the two parts of body 12 are held together in any suitable manner such as by adhesive 37, for example.

Inside the body 12 are two fixed pick-off coils 39 and 40, each mounted on a bobbin 41, to cooperate and react with the moving coils 34 and 35. The four leads 42 from the fixed coils are routed through body slots 44 for the spokes 24, up the outside of the upper body part, to the same end of the body as the force coil leads and moving coil leads. As will be seen from FIGURES 1 and 2, all electrical leads are soldered to the terminals 27, leaving ample slack in the fine leads from the proof mass so that the interference to proof mass motion is minimized to a negligible amount. FIGURE 8 shows a purely schematic arrangement of the various coils and their connections to the external terminals 27.

In use, the primary coils, say coils 39 and 40, are preferably to be excited with a signal having a frequency between 1 kc. and 500 kc. and a voltage from them is induced into the secondaries, say coils 34 and 35.

In place of the moving coils 34 and 35, iron rings 90 and 91 attached to the proof mass assembly 14 as shown in FIGURE 10 may be used, in an alternate pick-off configuration, thus eliminating flexible leads from the proof mass assembly 14 to the terminals 27. The material of these rings is not limited to iron, as other material can be used. In this arrangement, four fixed coils 92 through 95 (FIGURE 10) are mounted in the body 12, two acting as primary coils and the other two as secondaries, the coupling between them being varied by the axial position of the iron rings 90 and 91 during operation. Axial position adjusting means for the four coils 92–95 is provided similar to that for the two fixed coils 39 and 40 shown in FIGURE 6.

The guided prism 31 mounting structure is as follows. At 120-degree spacings around each end of body 12 is a set of three radial adjusting screws 45 operating in slightly compressible threaded sleeves 46 within corresponding bores in the body. Channels 61 in the inside diameter of the mounting sleeve 19 accommodate the adjusting screws 45. The screws 45 regulate the force of springs 47 bearing against the spherical ends of respective guides 49. Guides 49 are made of a material having good wearing characteristics and a low coefficient of friction, such as Teflon, and each has a small flat inner end which bears very lightly against a flat side surface of the prism 31. The proof mass assembly 14 is thus aligned and guided in the pick-off body 12, and the screws 45 are adjusted so that the precise desired amount of spring load is applied to the guides 49.

A positive locking arrangement is provided for the adjusting screws 45. At each screw location, a diametrical slot 50 and an offset axial slot 51 which extends partially along the end face of the body 12 and intersects the periphery thereof, are cut to define a cantilevered projection 52 of the body end. As shown particularly in FIGURE 7, a locking screw 54 passes perpendicularly through the projection 52 and threads into the body 12. Each slot 50 is cut deep enough toward the centerline of the body 12 to intersect the axial slot 51 behind the locking screw 54, and one end of slot 50 also intersects the lateral wall of the hole made for the sleeve 46. When the correct guide adjustment is made, tightening each locking screw 54 bends the projection 52 slightly down and forces the compressible threaded sleeve 46 to grip the adjusting screw 45 and thus lock the adjustment.

Figure 6:
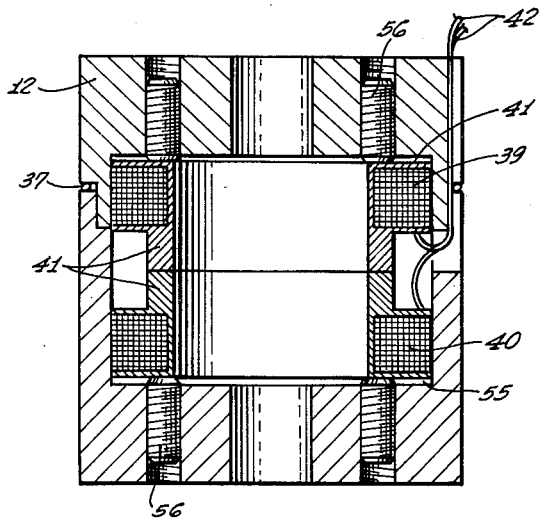
FIGURE 6 is another sectional elevation view of the same assembly, taken as indicated by broken line 6—6 in FIGURE 4 and omitting certain detail for clarity, showing means for adjusting the null position of the accelerometer.
Figure 7:
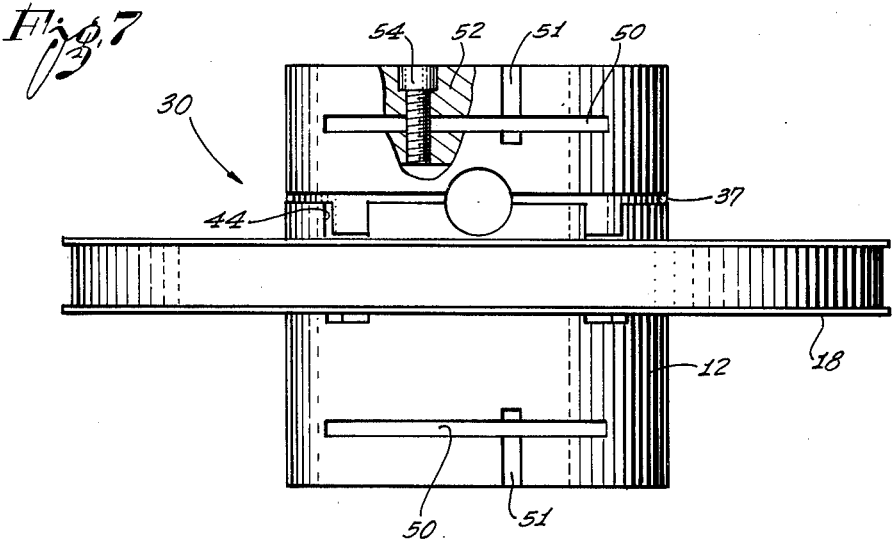
FIGURE 7 is a side view of the assembly of FIGURE 4, partly in section, viewed from the direction indicated by the arrow 7 in FIGURE 4, showing locking means for a guide adjustment of the present invention.

For adjustment of the neutral position of the accelerometer, FIGURE 6 shows that the fixed coils 39 and 40 have an adjustment space 55 within the pick-off body 12. Threaded vertically through each end of body 12 are three null-adjusting screws 56, the inner ends of which bear against the outer side of the adjacent fixed coil bobbin 41. By turning these latter screws 56, the position of the fixed coils 39 and 40 is changed up or down relative to the pick-off body 12, and this will vary the null or neutral position of the proof mass assembly 14. In the normal type of elastically centered accelerometer, this is the rest position of the proof mass when it is undergoing no acceleration along the sensing axis. In the magnetic oscillator accelerometer this is the central position about which the proof mass oscillates at zero acceleration and with balanced or symmetrical oscillating pulses in the force coil 17.

To provide a mechanical stop for the proof mass, a mechanical stop screw 57 is installed in each end of the body 12 as close to the axis as possible, where it can contact the moving coil 34 or 35 and thus limit the maximum linear movement of the proof mass. The mechanical limits are of course beyond the normal operating limits of a particular accelerometer, which in one instrument has a normal double amplitude of travel of approximately .006 inch in steady-state oscillation.

To operate with an external temperature compensating circuit (not shown), a temperature compensating coil 59 may be provided in each of the upper and lower magnet sets, as shown in FIGURE 1. One of the vent holes 60 in each magnet 15 can be used to carry out the compensating coil leads to the desired terminals 27.

A minimum magnetic field will exist in the area of the moving or fixed coils 34, 35, 39, and 40. Therefore, as mentioned previously, the force coil spider 25 and the pick-off body 12 are made of aluminum or aluminum alloy, for example, so that reaction from said field will be negligible. The outer case 10, case cover 26, and magnet mounting sleeve 19 are made of non-magnetic stainless steel or aluminum, and all screws throughout the accelerometer are preferably of non-magnetic material.

Figure 9:
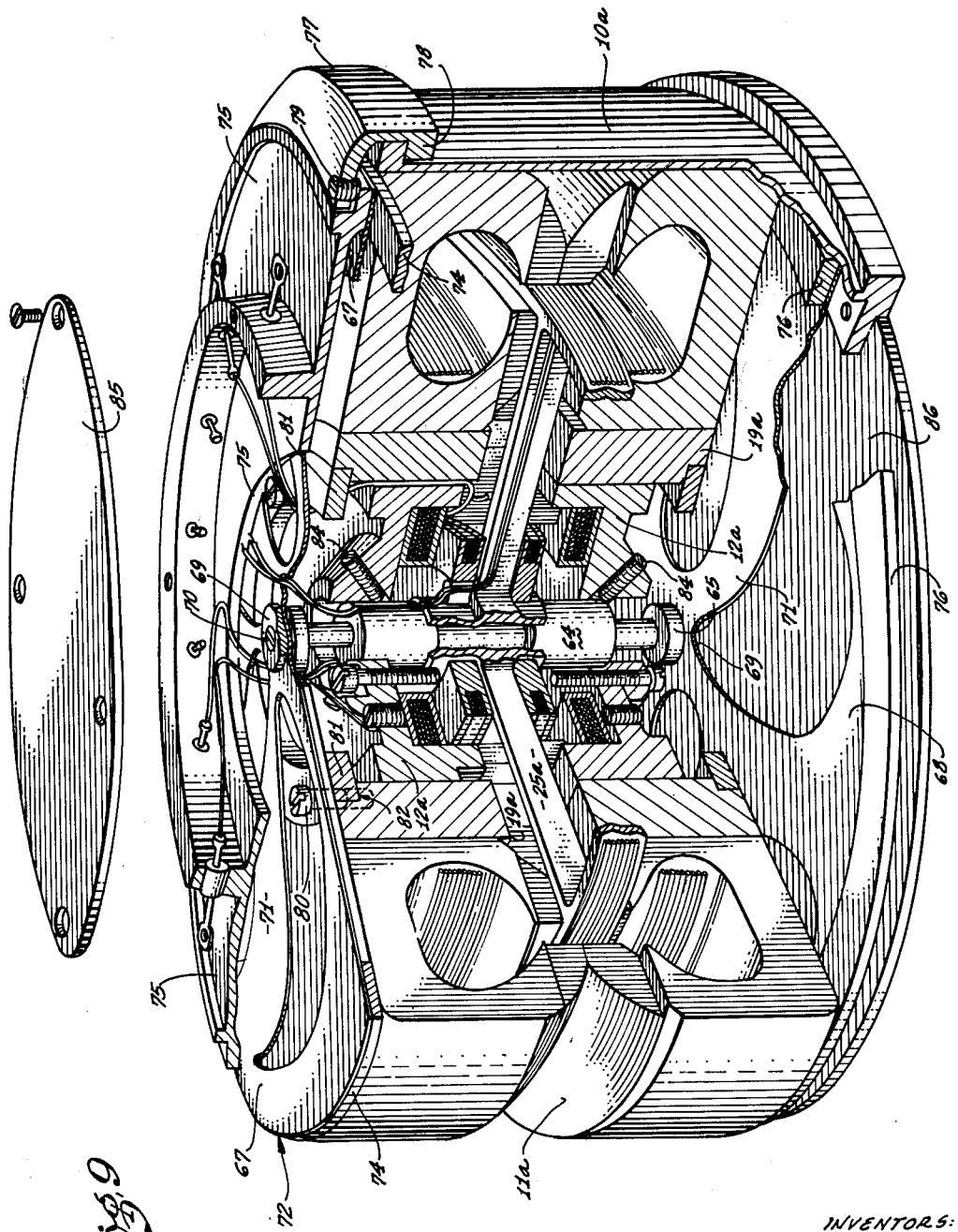
FIGURE 9 is a perspective view similar to FIGURE 1, showing a flexure suspension and alternate body retaining means.

FIGURE 9 shows the novel flexural suspension installed in the accelerometer, as differentiated from the guided suspension of FIGURE 1. All accelerometer parts in FIGURE 9 which correspond to those in FIGURE 1 are identified by corresponding reference numbers with the suffix "a" added. The proof mass assembly in this case includes a central support rod 64 to which is fixed the force coil spider 25a. The support rod 64 extends beyond both ends of the pick-off body 12a. At each end of the rod 64 is provided an external shoulder 65 and a short internally threaded shank (not visible) beyond the shoulder 65.

A flexure disc 67 and 68 is centrally fastened to each shank by a retainer 69 and a disc screw 70. Each of the two discs 67 and 68 is a large diameter, thin, flat elastic membrane having radial curved fingers 71 which decrease in width toward the center, and a continuous peripheral edge 72. A non-magnetic material is used, such as beryllium copper for example. The discs 67 and 68 are very critical parts, the fingers 71 being formed by chemical etching, and the exact degree of flatness produced by an optical flat heat treat technique. In the actual instrument referred to hereinbefore, the discs 67 and 68 are .002 inch thick.

At the peripheral edge 72, the upper flexural disc 67 is held between a spacer ring 74 and the outer edge surface of a terminal frame 75. The lower flexural disc 68 is held between a lower spacer 76 and the bottom of the outer case assembly 10a. The spacers 74 and 76 thus maintain an operating clearance between the discs 67, 68 and the magnet assembly 11a. Before final tightening, the discs can be radially moved between the peripheral holding means just described.

Centering of the proof mass assembly is accomplished by internal means to be described later. After proper centering, the discs 67 and 68 are both clamped tightly by installation means at the top of the instrument, this means comprising a flanged collar 77 and a plurality of set screws 79 bearing against the top of the terminal frame 75 as shown in FIGURE 9. Notches (not shown) in a flange 78 of the collar 77 and in a mating flange on the casing 10a permit engagement of the collar with a twisting motion like a bayonet type socket.

Other flexural mounting means may obviously be provided if desired. For instance, to entirely isolate the outer casing parts from the flexural discs 67 and 68, a second set of spacer rings similar to rings 74 and 76 may be included, along with attaching means to the magnets, the discs being adjustably sandwiched between the rings.

As further shown in FIGURE 9, the pick-off body 12a is adjustably and firmly held in its desired position by body adjusting screws 80 through a pair of clamps 81 resting in internal shoulders 82 in the magnet mounting sleeve 19a. This body mounting and adjusting means can also be incorporated in the guided assembly shown in FIGURE 1, if desired.

The discs 67 and 68 are stiff in the radial direction and thus provide the required immunity from cross-coupling effects. Also, the proof mass is provided with adjustable centering means. This is accomplished by two sets of three centering screws 84 passing diagonally through the body 12a, the screw ends serving to align and center the support rod 64 during assembly. Then after the flexure disc edge is clamped by the set screws 79, the centering screws 84 are backed out of the way to allow unimpeded operation of the proof mass. These centering screws 84 are accessible from the ends before the top and bottom covers 85 and 86 are installed to complete the mechanical assembly.

It is thus seen that a very compact and precise accelerometer assembly has been provided. Some embodiments reduced to practice as described herein have an outside diameter of 2.43 inches, for example, and fabrication of an appreciably smaller 1.68 inch diameter sub-miniature model has been accomplished. The suspension structure provides a stiff sensitive-axis alignment, resulting in inherent low level cross-coupling of forces in other directions, and in freedom from anisoelastic effects. Either the flexural or the guided suspension structure is easily designed to fit in the same case and magnet assembly.

It might be supposed that in a guided suspension system like the present one, resultant friction would create too large a force deadband in a device such as a precision accelerometer. However, the effect of friction deadband is intimately related to the time spent with the proof mass stationary relative to the case. Using an oscillating system, a steady controlled motion is maintained, and objections pertaining to friction are overcome.

Due to the symmetric magnet arrangement and enclosed centralized magnetic gap described herein, inherent shielding from external field perturbations is provided, thus preserving the high order of magnetic stability. The number of magnet sections in each set is not restricted to three, since obviously two or four, or more, may be employed rather than the three disclosed herein.

Our present invention is not concerned with the control electronics necessary for a complete accelerometer system. However, this invention is particularly well adapted to incorporation in a direct digital type acceleration measuring system wherein clock pulses at a frequency of substantially 100 kilocycles per second, for example, are gated into two respective counting circuits by reversals of the force coil current at the proper times to maintain proof mass oscillation about the reference or neutral position. The frequency of oscillation is designed to vary with the desired range of the instrument, a practical value for a 20 g accelerometer being in the neighborhood of 250 cycles per second, for instance.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. In an accelerometer, a proof mass assembly including an elongated axial prism to which is affixed signal means, body means movably containing said proof mass assembly so that the sensitive operating axis of the accelerometer is the longitudinal axis of said prism, and a plurality of radially adjustable prism guide means in said body means at each end of said prism, said guide means including a plurality of smooth bearing elements having flat inner ends slidably bearing against respective smooth sides of said prism and restrained from axial movement.

2. Apparatus in accordance with claim 1 wherein said prism is fuzed quartz and said bearing elements are a slick plastic material.

3. Apparatus in accordance with claim 1 wherein said guide means further includes a coil spring with one end bearing against each of said bearing elements, a screw bearing against the other end of each of said springs, and threaded means in said body receiving said screws, and screw locking means in said body whereby the adjustment position of said screws is clamped.

4. In an accelerometer, a proof mass assembly including an elongated axial prism to which is affixed signal means, body means movably containing said proof mass assembly so that the sensitive operating axis of the accelerometer is the longitudinal axis of said prism, a plurality of radially adjustable prism guide means in said body means at each end of said prism, said guide means including a plurality of smooth bearing elements slidably bearing against respective sides of said prism and restrained from axial movement, a coil spring with one end bearing against each of said bearing elements, a screw bearing against the other end of each of said springs, threaded means in said body receiving said screws, and screw adjustment locking means comprises a pair of mutually perpendicular and intersecting linear slots cut partially through said body adjacent each said screw to form a cantilever projection overhanging each said threaded means, and a clamping screw inserted through each said projection and threaded into said body, whereby tightening said clamping screw binds said threaded means on said screw.

5. In an accelerometer, a proof mass assembly comprising an elongated axial prism longitudinally movable in a straight line direction along the sensing axis of said accelerometer, signal means affixed intermediate of the ends of said prism, body means surrounding said proof mass assembly, signal pick-off means mounted in said body and cooperatively associated with said signal means on said prism, and a plurality of radially adjustable prism guide means at each end of said body means, said guide means including a plurality of smooth bearing elements slidably bearing against respective smooth sides of said prism, said bearing elements being the sole contact and suspension of said proof mass assembly in said body means.

6. In an accelerometer, a proof mass assembly comprising an elongated axial prism longitudinally movable in a straight line direction along the sensing axis of said accelerometer, signal means affixed intermediate of the ends of said prism, body means surrounding said proof mass assembly, signal pick-off means mounted in said body and cooperatively associated with said signal means on said prism, a plurality of radially adjustable prism guide means at each end of said body means, said guide means including a plurality of smooth bearing elements slidably bearing against respective sides of said prism, permanent magnet means fixed in surrounding relation to said body, means defining a continuous magnetic gap in said magnet means, said gap forming an annular ring space in a plane perpendicular to said sensing axis and centered thereon, a coil support structure fixed to said prism substantially at the center thereof and extending outwardly to said magnetic gap, and a force coil wound on said support structure and located in said gap, the electrical leads of said force coil extending radially inwardly to said prism and axially therealong to extend from an end of said body.

7. In an accelerometer, a proof mass assembly movable in a straight line direction along the sensing axis of said accelerometer, fixed body means mounting and containing said proof mass assembly, magnet means fixed in surrounding relation to said body and containing a magnetic gap forming a continuous annular ring centered at said sensing axis, a coil support structure fixed to said proof mass assembly, said support structure having a plurality of spoke elements extending outwardly through an equal plurality of clearance spaces in said body means to said magnetic gap, a rim on the outer ends of said spoke elements, a force coil wound on said rim and located in said magnetic gap, and signal pick-off means in said body responsive to relative movement of said proof mass assembly.

8. In an accelerometer, a proof mass assembly movable in a straight line direction along the sensing axis of said accelerometer, fixed body means surrounding and containing said proof mass assembly, magnet means fixed in surrounding relation to said body and containing a magnetic gap forming a continuous annular ring centered at said sensing axis, a coil support structure fixed to said proof mass assembly, a coil wound on said support structure and located in said magnetic gap, and signal pick-off means in said body responsive to relative movement of said proof mass assembly, said magnet means comprising a plurality of upper magnet segments each being arcuate in overall shape and having a hollow cross section with a magnetic gap in the center of the lower side, said upper magnet segments being fit together end to end to form a circle, a similar plurality of lower magnet segments with a magnetic gap in the center of the upper side of each, the resulting circle of lower segments contacting said upper segments with the gaps of each plurality aligned to thus form a single composite enclosed magnetic gap.

9. Apparatus in accordance with claim 8 wherein said coil support structure has spokes extending from said proof mass assembly to said magnetic gap, said magnet segments and said body means having clearance spaces formed therein to accommodate operation of said spokes, and wherein the interior diameter of said magnet assembly is cylindrical.

10. In a magnetic accelerometer, a magnet assembly comprising a plurality of upper magnet segments each being arcuate in overall shape and having a hollow cross section with a magnetic gap in the center of the lower side, said upper magnet segments being fit together end to end to form a circle, a similar plurality of lower magnet segments with a magnetic gap in the center of the upper side of each, the resulting circle of lower segments contacting said upper segments with the gaps of each plurality aligned to thus form a single composite enclosed magnetic gap.

11. Apparatus in accordance with claim 10 wherein each of said magnetic segments is a single piece of homogeneous magnet material.

12. Apparatus in accordance with claim 10 including a cylindrical sleeve fixed to the inner diameter of said magnet assembly, and an exterior casing contacting and housing said magnet assembly.

13. In an accelerometer, a proof mass assembly movable in a straight line along the sensing axis of said accelerometer, signal means fixed to said proof mass assembly, body means surrounding and containing said proof mass assembly, said body means comprising two mating cup portions, a pair of pick-off coils mounted one in each of said cup portions, means for adjusting the position of said pair of coils axially in said body, and electromagnetic means surrounding said cup portions for producing axial forces on said proof mass assembly, said electromagnetic means including a permanent magnet assembly having circular concentric north and south poles respectively located at slightly different radial distances from the sensing axis to form a continuous radial magnetic gap between said poles and around the sensing axis, said permanent magnet assembly further comprising a structure of magnet material substantially figure 8 shaped in cross section defining a double toroid-like space having the longitudinal ends of said gap connecting the two opposite portions of said figure 8 shape, and means attached to said proof mass supporting a force coil movable in said magnetic gap.

14. Apparatus in accordance with claim 13 wherein said signal means comprises at least one coil having its leads extending out axially from said body.

15. In an accelerometer, a proof mass assembly movable in a straight line along the sensing axis of said accelerometer, signal means fixed to said proof mass assembly, body means surrounding and containing said proof mass assembly, said body means comprising two mating cup portions, a pair of pick-off coils mounted one in each of said cup portions, means for adjusting the position of said pair of coils axially in said body, and electromagnetic means surrounding said body for producing axial forces on said proof mass assembly, said position adjusting means comprising a bobbin upon which each of said pair of pick-off coils is individually wound, adjacent interior edges of said bobbins abutting one another, said bobbins being slidable axially in said body, and a plurality of set screws threaded through each end of said body and bearing perpendicularly against opposite outside respective ends of said bobbins.

16. Apparatus in accordance with claim 15 wherein said electromagnetic means comprises a force coil spider fixed to said proof mass assembly substantially at the center thereof, spokes on said spider extending radially outwardly beyond said body and between said pair of pick-off coils, there being slots in said cup portions of said body at their mating edges and slots in said bobbins at their abutting edges for passages of said spokes, a continuous rim fixed at the extremities of said spokes, a force coil wound on said rim, and wherein said signal means comprises a pair of electrical coupling members mounted one on each immediate opposite side of said spider at the hub thereof in signal-coupling relation to said pick-off coils.

17. In an accelerometer, a proof mass assembly movable in a straight line along a sensing axis of said accelerometer, a force coil support fixed to said proof mass assembly, said support having outwardly extending spokes and a circumferential rim on which a force coil is wound, electrical signal means fixed to said proof mass assembly, body means containing said proof mass assembly, said body means comprising two mating cup portions with slots provided therein for outward passage of said spokes, a pick-off coil mounted in said body on each side of said slots, means for adjusting the position of said pick-off coils axially in said body, and a circular magnet assembly fixed around the outside of said body and having a circular magnetic gap therein which contains said force coil, the leads from said coils extending axially out one end of said body.

18. Apparatus in accordance with claim 17 wherein said proof mass assembly includes an elongated axial prism and suspension means in said body for movably mounting said proof mass assembly, said suspension means comprising a plurality of radially adjustable guide means near each end of said prism, said guide means including a plurality of spring-loaded smooth bearing elements slidably bearing against respective sides of said prism.

19. In an accelerometer, a proof mass assembly including an axially movable central support rod, body means movably containing said proof mass assembly, an elastic flat disc centrally fastened to each end of said rod, disc edge clamping means in said body firmly clamping the periphery only of said discs, said disc periphery is adjustably clamped by said clamping means in various lateral positions, and including a plurality of centering screws threaded diagonally through a center portion of said body means and bearable on said support rod near each respective end thereof, said centering screws being accessible through access openings in said clamping means after said clamping means is tightened.

References Cited in the file of this patent

UNITED STATES PATENTS

| | | |
|---|---|---|
| 1,259,861 | Henry | Mar. 19, 1918 |
| 1,458,831 | Lange | June 12, 1923 |
| 1,848,057 | Darey | Mar. 1, 1932 |
| 2,093,414 | Burgan | Sept. 21, 1937 |
| 2,342,141 | Hansen | Feb. 22, 1944 |
| 2,570,672 | Hathaway | Oct. 9, 1951 |
| 2,643,869 | Clark | June 30, 1953 |
| 2,767,973 | Veen | Oct. 23, 1956 |
| 2,780,101 | Kinkel | Feb. 5, 1957 |
| 2,869,851 | Sedgfield et al. | Jan. 20, 1959 |
| 2,896,447 | Phillips | July 28, 1959 |
| 2,899,037 | Pierce | Aug. 11, 1959 |
| 2,916,279 | Stanton | Dec. 8, 1959 |
| 2,947,529 | Schwartz | Aug. 2, 1960 |
| 2,985,021 | Lewis et al. | May 23, 1961 |